US005955022A

United States Patent [19]

Walker et al.

[11] Patent Number: 5,955,022

[45] Date of Patent: Sep. 21, 1999

[54] PROCESS OF MAKING AN ORIFICE PLATE FOR A PAGE-WIDE INK JET PRINTHEAD

[75] Inventors: Kelsey R. Walker, Hockley; Daniel B. Granzow, Spring, both of Tex.

[73] Assignee: Compaq Computer Corp., Houston, Tex.

[21] Appl. No.: 08/797,838

[22] Filed: Feb. 10, 1997

[51] Int. Cl.[6] .......... B23K 26/00; B29C 35/08

[52] U.S. Cl. .......... 264/400; 264/154; 264/482

[58] Field of Search .......... 264/138, 154, 264/400, 482

[56] References Cited

U.S. PATENT DOCUMENTS

| | | | |
|---|---|---|---|
| 4,536,097 | 8/1985 | Nilsson | 347/71 |
| 4,879,568 | 11/1989 | Bartky et al. | 347/69 |
| 4,887,100 | 12/1989 | Michaelis et al. | 347/69 |
| 5,016,028 | 5/1991 | Temple | 347/69 |
| 5,208,980 | 5/1993 | Hayes | 29/890.1 |
| 5,227,813 | 7/1993 | Pies et al. | 347/71 |
| 5,235,352 | 8/1993 | Pies et al. | 347/71 |
| 5,365,645 | 11/1994 | Walker et al. | 29/25.35 |
| 5,417,897 | 5/1995 | Asakawa et al. | 264/400 |
| 5,433,809 | 7/1995 | Pies et al. | 156/268 |
| 5,487,852 | 1/1996 | Ludden et al. | 264/400 |

FOREIGN PATENT DOCUMENTS

| | | |
|---|---|---|
| 486256 | 5/1992 | European Pat. Off. . |
| 615845 | 9/1994 | European Pat. Off. . |
| WO93/19940 | 10/1993 | WIPO . |

*Primary Examiner*—Leo B. Tentoni
*Attorney, Agent, or Firm*—Vinson & Elkins L.L.P.

[57] ABSTRACT

A page-wide, drop-on-demand type ink jet printhead and an associated method of manufacturing an orifice plate. The orifice plate is comprised of a block of material in which a first portion of the block of material has been removed to define an ink reservoir. Also formed in the orifice plate are a series of apertures, each of the apertures includes an ink jet and an ink jet nozzle. A fill channel, which extends between the ink reservoir and each ink jet, is also formed in the orifice plate to provide a supply of ink to the ink jet. An intermediate layer is mounted to the orifice plate. The intermediate layer is formed of an active piezoelectric material and a series of piezoelectric actuators, each acoustically coupled to a corresponding one of the series of apertures, are formed on the intermediate layer. By applying a voltage differential between first and second electrodes, which make up each piezoelectric actuator, the intermediate layer is deflected to effect ejection of a droplet of ink from the aperture acoustically coupled to each piezoelectric actuator.

12 Claims, 3 Drawing Sheets

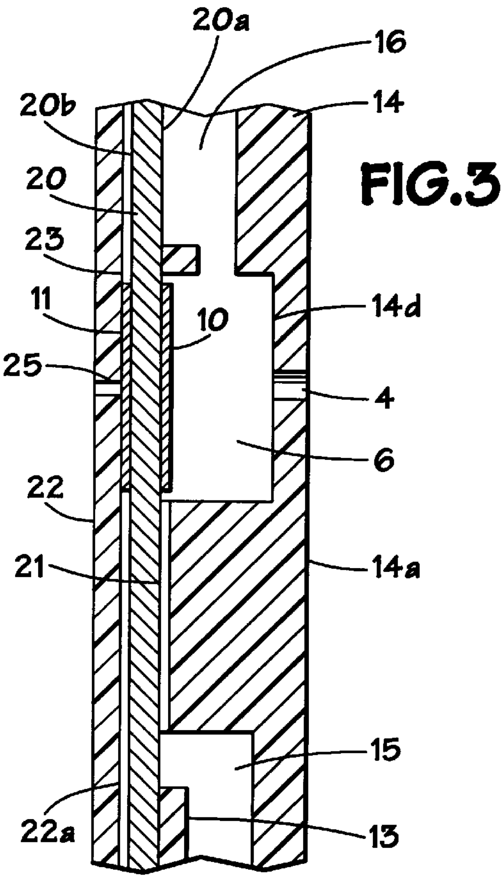
FIG.3
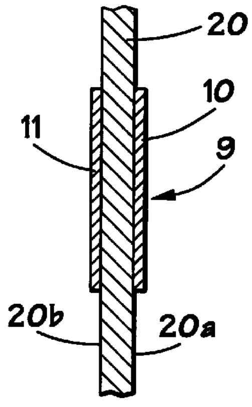
FIG. 4
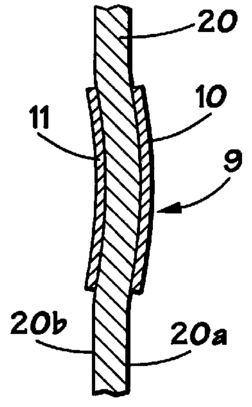
FIG. 5
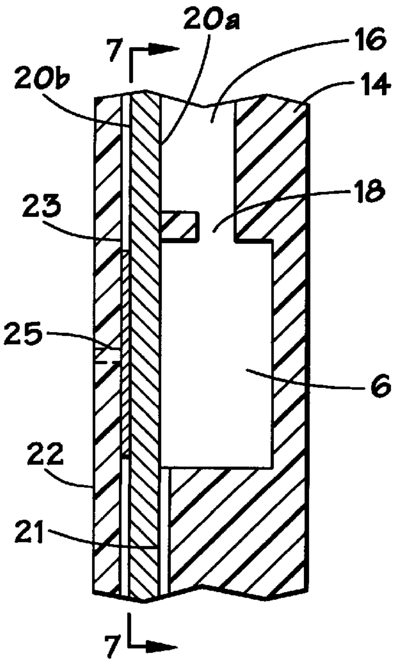
FIG.6
FIG.7
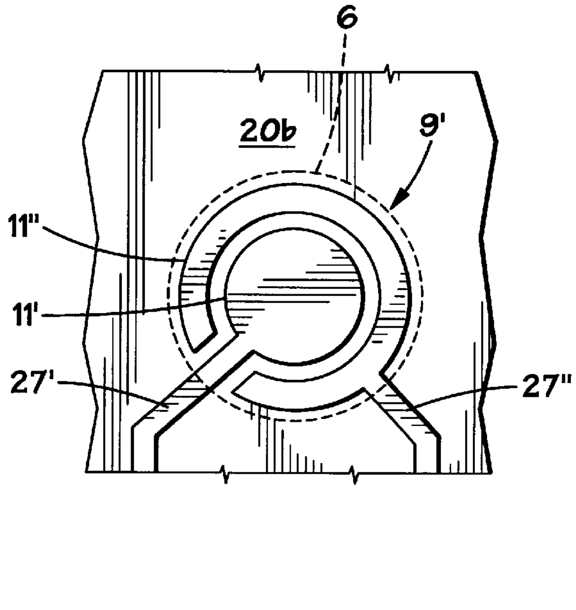

FIG.8
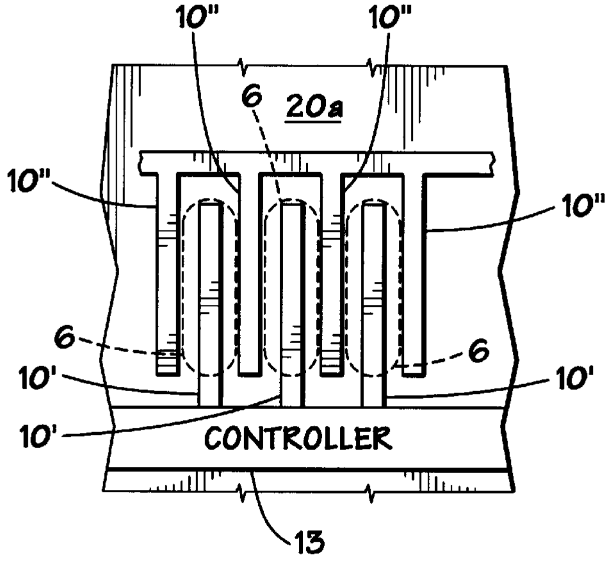
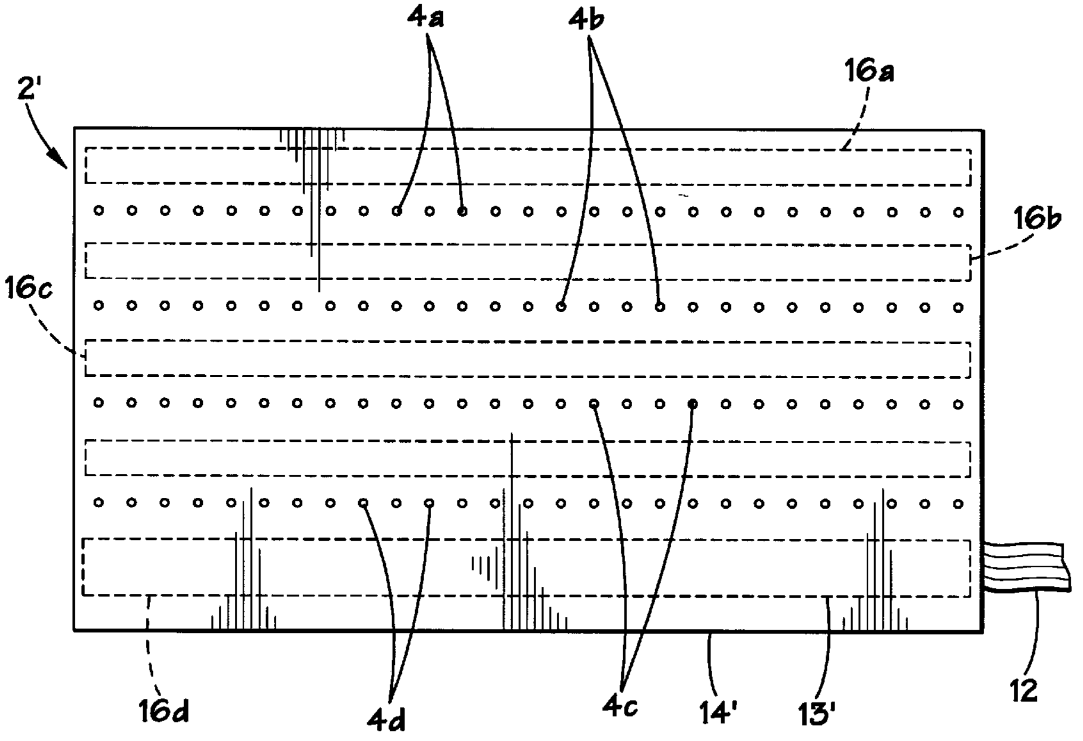
FIG. 9

PROCESS OF MAKING AN ORIFICE PLATE FOR A PAGE-WIDE INK JET PRINTHEAD

BACKGROUND OF THE INVENTION

1. Field of the Invention

The present invention relates to ink jet printing systems and, more particularly, to a drop-on-demand type ink jet printhead having a page-wide array of piezoelectric actuators.

2. Description of Related Art

Ink jet printing systems use the ejection of tiny droplets of ink to produce an image. The devices used in ink jet printing systems produce highly reproducible and controllable droplets, so that a droplet may be printed at a location specified by digitally stored image data. Most commercially available ink jet printing systems may be generally classified as either a "continuous jet" type or a "drop-on-demand" type. In the "continuous jet" system, ink droplets are continuously ejected from the printhead and either directed to or away from the paper depending on the desired image to be produced. In the "drop-on-demand" type ink jet printing system, ink droplets are ejected from the printhead in response to a specific command related to the image to be produced.

In the drop-on-demand type ink jet printing systems, transient pressures in the fluid are induced by the application of a voltage pulse to a piezoelectric material which is directly or indirectly coupled to the fluid. These transient pressures cause pressure/velocity transients to occur within the fluid and these pressure/velocity transients are directed to produce a droplet that issues from an orifice. Recently, considerable interest has been directed to piezoelectric drop-on-demand type ink jet printheads which utilize sidewall actuators to impart droplet ejecting pressure pulses into the ink carrying channels. See, for example, U.S. Pat. No. 4,536,097 to Nilsson, U.S. Pat. No. 4,879,568 to Bartky et al., U.S. Pat. No. 4,887,100 to Michaelis et al., U.S. Pat. No. 5,016,028 to Temple, U.S. Pat. No. 5,227,813 to Pies et al. and U.S. Pat. No. 5,235,352 to Pies et al. The Bartky et al., Michaelis et al. and Temple patents further disclose shear mode sidewall actuators characterized by extending the poling direction normal to the widthwise direction of the page. Both of the patents to Pies et al. disclose shear mode sidewall actuators characterized by extending the poling direction in the widthwise direction of the page.

The printhead configurations disclosed in the Pies et al. patents may be manufactured in accordance with the techniques disclosed in U.S. Pat. No. 5,433,809 to Pies. In accordance with this technique, the side surfaces of an unpolled thin piece of piezoelectric material are electroded and a voltage applied there across to pole the thin piece. Once polled, these electrodes are stripped off and a layer of conductive material is deposited on the top and bottom side surfaces of the thin piece to enable shear mode excitation. The thin piece of piezoelectric material is conductively mounted to a base and a series of sidewalls. The series of sidewalls are produced by forming parallel grooves which extend through the thin piece and part of the base piece; for example, by using a sawing process.

One drawback to such a method of manufacture is that the technique is only suitable for manufacturing an ink jet printhead having a relatively narrow widthwise dimension. This method of manufacture cannot be readily applied to the manufacture of page-wide arrays. Specifically, the aforementioned thin piece was poled in the widthwise direction, i.e. the direction generally parallel to the width of the page.

Typically, to properly pole piezoelectric material, a voltage differential on the order of 30 to 75 volts per mil (i.e., per one-thousandth of an inch) is required. Accordingly, to pole a one inch wide piece requires a voltage differential somewhere in the range of 30,000 and 75,000 volts. This poling voltage requirement currently limits the manufacturable width of an ink jet printhead body to about two inches since an appreciably wider piezoelectric body section would require an unacceptably higher poling voltage. For example, an eight and one-half inch (or "page") wide piezoelectric printhead would require a poling voltage somewhere in the range of 255,000 to 637,500 volts. Even if this much wider PZT body section could be properly poled at this extremely high voltage, the material would tend to crack during or upon completion of the poling process for the PZT body section.

This PZT printhead body width limitation has resulted in the inability to manufacture piezoelectric ink jet printheads in full page, i.e. eight and one-half inch, widths. This necessitates the shuttling back and forth of a relatively small width, i.e., one inch, piezoelectric printhead across a print medium sheet interiorly traversing the ink jet printer. While acceptable for many uses, such small width or "shuttle-type" ink jet printheads are generally characterized by numerous disadvantages that render them less desirable than page-wide devices. One disadvantage of shuttle printheads is that printing speed is restricted since two mechanical steps, printhead movement across print medium and print medium progression, are required. Further, because ink must be selectively ejected from the shuttle printhead as the print medium is progressing through the printer and the printhead is simultaneously moving across the paper medium, the print quality obtainable with such a printhead may be affected due to difficulties of timing the ejection of ink in coordination with the movement of the print medium and the mechanical movement of the printhead.

An additional disadvantage of the shuttle printhead is that such a printhead cannot easily be utilized where multiple colors or types of ink are to be used. This difficulty occurs because the shuttle printhead is typically fed by a single ink source or reservoir. To feed a shuttle printhead with more than a single color or type of ink, print speed or quality must be sacrificed. In particular, if multiple ink colors or types are simultaneously utilized in the narrow width printhead, the total number of ejection nozzles of the printhead must be allocated among the multiple colors or types of ink. Such an allocation reduces the number of nozzles available for printing with any one of the colors or types of ink at a given time. An alternative to the allocation of ejection nozzles for multiple colors or types of ink would be a mechanism employed for switching ink sources to the printhead from time to time during the printing process so that only a single ink of the multiple colors or types of ink available feeds the printhead at any given time. In each of these cases, however, the limitations of speed or quality are encountered when seeking to employ the multiple colors or types of ink. One solution to overcoming these limitations might appear to be widening of the printhead to allow multiple ink colors or types to be employed simultaneously or otherwise; however, as previously discussed, widening the printhead has typically resulted in a host of other problems.

As a result, it has been further contemplated that several such printheads be physically attached to each other to form a page-wide device. U.S. Pat. No. 5,365,645 to Walker discloses a method by which plural two-inch wide blocks of piezoelectric material are stitched together to form a single page-wide array. The difficulties associated with stitching several blocks of piezoelectric material into a single page-wide array, however, adds considerable cost to the manufacture of such a device. Furthermore, such techniques raise some concerns as to the uniformity of channels that extend across the boundary between two pieces of stitched piezoelectric material. Finally, positional inaccuracies resulting from misalignments during the stitching of multiple narrow printheads also occur.

It would thus be an improvement in the art to provide a page-wide printhead that could simultaneously deliver multiple ink colors or types without loss of speed or print quality.

Thus, it is desired to provide a drop-on-demand type ink jet printhead having a page-wide array of piezoelectric actuators. Accordingly, it is an object of the present invention to provide such a printhead and an associated method of manufacturing the same.

SUMMARY OF THE INVENTION

The present invention is a method for constructing an orifice plate for a page-wide ink jet printhead. A block of material is provided and a first area of a back side surface of the block is selected. A first interior side surface of the block is then exposed for the selected area to form an ink reservoir for the orifice plate. A series of spaced locations along a line extending across the remaining portion of the back side surface of the block are then selected and a second interior side surface of the block is exposed at the series of spaced locations to form a series of inkjets for the orifice plate. An ink ejection nozzle which extends between the second interior side surface and a front side of the block is then formed for each one of the series of ink jets. A fill channel which extends between the ink reservoir and an ink jet may then be formed for each of the ink jets. Preferably, the block of material is formed of an ablative material such as polyamide and the ink reservoir, ink jets, ejection nozzles and fill channels are formed by ablating selected portions of the block of material using an excimer laser.

The present invention also encompasses an orifice plate for a page-wide ink jet printhead. The orifice plate is a block of material having a first portion of the block of material removed to expose a first interior side surface and to define an ink reservoir. A series of apertures are also formed in the orifice plate, each extending from a back side surface of the orifice plate to a front side surface thereof. The apertures are generally parallel to each other along their lengths and include a first, wider portion extending from the back side surface to a second interior side surface and a second, narrower portion extending from the second interior side surface to the front side surface. The first portions of said apertures define a series of ink jets for the orifice plate and the second portions of the apertures define a corresponding series of ink ejection nozzles for the orifice plate. A fill channel which extends between the ink reservoir and an ink jet may be formed for each of the ink jets.

In another aspect, the present invention encompasses a page-wide drop-on-demand type ink jet printhead which includes an orifice plate, as described above, and intermediate layer mounted to the orifice plate. Formed on the intermediate layer are a series of piezoelectric actuators, each acoustically coupled to a corresponding aperture in the orifice plate. In one aspect of the invention, the intermediate layer is comprised of an active piezoelectric material and, in another aspect of the invention, each of the piezoelectric actuators has first and second electrodes mounted on a side surface of the intermediate layer. By applying a voltage differential between the first and second electrodes, the intermediate layer is deflected to effect ejection of a droplet of ink from the aperture acoustically coupled thereto. The page-wide drop-on-demand type ink jet printhead may also include a controller coupled to each of the first electrodes. By selectively applying voltage to the first electrodes, selected piezoelectric actuators are deflected.

In alternate aspects thereof, the first and second electrodes may be mounted on the same or opposite sides of the intermediate layer.

From the foregoing, it is apparent that a page-wide printhead, which overcomes the factors that have led to the use of narrow-width printheads, would be a significant improvement in the art. The present invention provides for a drop-on-demand type piezoelectric ink jet printhead configured as a page-wide array for page-wide printing, which printhead can also be utilized to deliver simultaneously multiple colors or types of ink and which has the additional benefits of simple and economical manufacture and implementation. The present invention, thus, overcomes problems previously encountered in ink jet printing technology and is a significant advance in such technology.

BRIEF DESCRIPTION OF THE DRAWINGS

For a more complete understanding of the present invention and for further objects and advantages thereof, reference may now be had to the detailed description of the invention, in conjunction with the accompanying drawings, in which:

FIG. 3 is a partial cross-sectional view taken at lines 3—3 of FIG. 2A;

FIG. 4 is a first cross-sectional view of a single piezoelectric actuator of the ink jet printhead of FIGS. 1–3 in a first, rest position;

FIG. 5 is a second cross-sectional view of the single piezoelectric actuator of FIG. 4 in a second, deflected position;

FIG. 6 is a partial cross-sectional view of the ink jet printhead of FIGS. 1–3 and illustrates an alternate configuration of the page-wide piezoelectric actuator array;

FIG. 7 is a partial rear elevational view of the active layer of the ink jet printhead of FIGS. 1–3, with the substrate removed, and further illustrates the alternate configuration of the page-wide piezoelectric actuator array;

FIG. 8 is a partial rear elevational view of the active layer of the ink jet printhead of FIGS. 1–3, with the substrate removed, and illustrates another alternate configuration of the page-wide piezoelectric actuator array; and FIG. 9 is a front elevational view of a multi-color, drop-on-demand type ink jet printhead having plural page-wide arrays of piezoelectric actuators.

DETAILED DESCRIPTION

Figure 1:
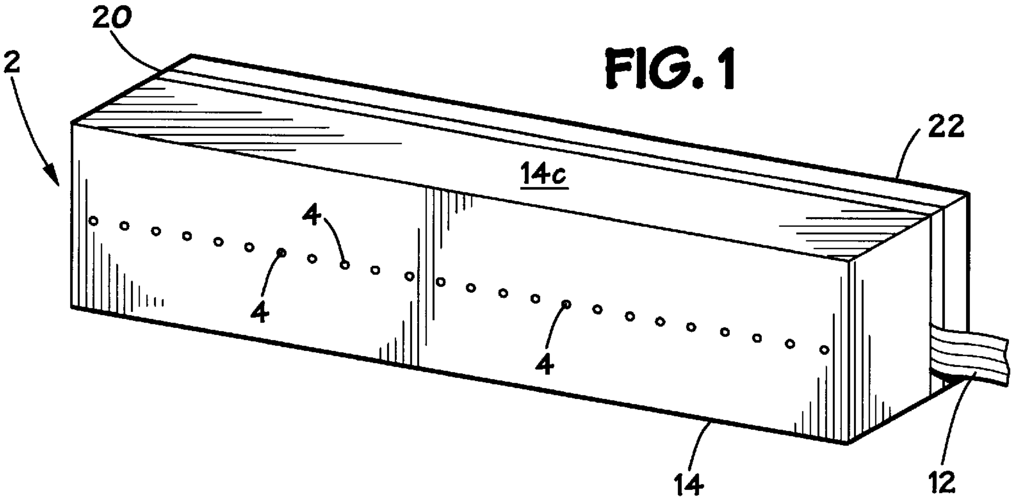
FIG. 1 is a front perspective view of a single color, drop-on-demand type ink jet printhead having a page-wide array of piezoelectric actuators and constructed in accordance with the teachings of the present invention.

Referring now to the drawings wherein thicknesses and other dimensions have been exaggerated in the various figures for explanatory purposes and wherein like reference numerals designate the same or similar views, in FIG. 1, a single color, drop-on-demand type ink jet printhead 2 having a page-wide array of piezoelectric actuators and constructed in accordance with the teachings of the present invention may now be seen. The ink jet printhead 2 is comprised of a substrate 22, an active layer 20 and a orifice plate 14. Formed in the orifice plate 14 is an ink manifold (not visible in FIG. 1) and a series of piezoelectrically actuatable ink jets (also not visible in FIG. 1), each of which terminates in an ink ejection nozzle 4 formed in the orifice plate 14. Preferably, the orifice plate 14 is formed from an ablative, non-conductive material, for example, polyamide, and includes on the order of about 3,300 ejection nozzles, one corresponding to each jet of an 11 inch page-wide ink jet printhead 2 having a jet density of about 300 jets per inch. It should be noted, however, that for ease of illustration, FIG. 1 shows the page-wide ink jet printhead as having 24 ink ejection nozzles 4. It should be further noted that, while an ink jet density of 300 jets per inch is specifically contemplated, it should be clearly understood that the number of ink jets in the page-wide ink jet printhead 2 may be varied without departing from the scope of the present invention.

Figure 2A:
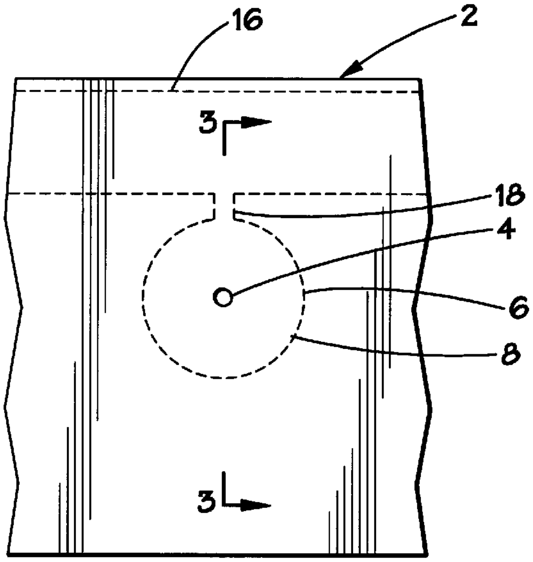
FIG. 2A is an enlarged partial front elevational view of the ink jet printhead of FIG. 1 and illustrates a single ink jet.

Referring next to FIG. 2A, a enlarged, partial front view of the ink jet printhead 2 that illustrates a single ink jet 6 thereof may now be seen. As certain portions of the ink jet 6 are not visible from the front side of the array 2, such portions are illustrated in phantom. Each ink jet 6 is generally cylindrical in shape and extends from the active layer 20, along an interior sidewall to the ink ejection nozzle 4. In operation, the ink jet 6 ejects ink from the nozzle orifice 4 in a direction perpendicular to the front side surface of the array (i.e., outward from the drawing page). As may be seen in phantom in the front view, a single ink reservoir 16, shared by each ink jet 6, is located above the ink jet 6. The ink reservoir 16 feeds ink stored therein to each individual ink jet 6 via a fill channel 18.

Figure 2B:
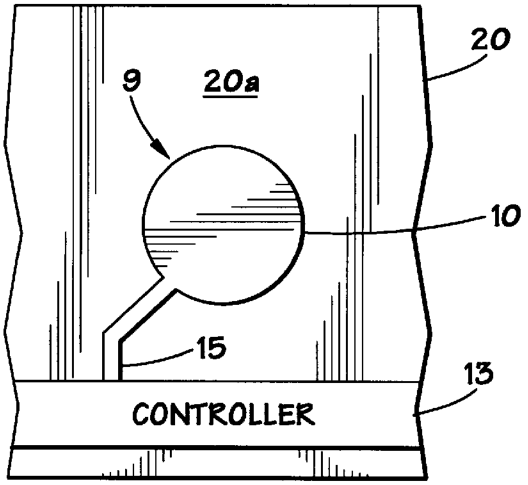
FIG. 2B is a second enlarged partial front elevational view of the ink jet printhead of FIG. 1, with the orifice plate removed, which further illustrates a single ink jet.

As will be more fully described below, a piezoelectric actuator 9, shown in FIG. 2B, formed by electroding a selected portion of the active layer 20 is coupled to each ink jet 6. To cause the ejection of a droplet of ink from the ink jet 6, the piezoelectric actuator 9 is displaced in a manner that imparts a pressure pulse to the ink contained in the ink jet 6 such that a droplet of ink is forcibly ejected from the ink ejection nozzle 4. Displacement of the piezoelectric actuator 9 to effect the ejection of a droplet of ink may be accomplished in various manners.

In a first manner illustrated in FIGS. 4–5, the piezoelectric actuator 9 is urged into the ink jet 6 by applying a first voltage differential between a first electrode 10 formed on a front side surface 20*a* of the active layer 20 and a second electrode 11 formed on a back side surface 20*b* of the active layer 20. By applying this first voltage differential, the piezoelectric actuator 9 moves from a rest position as illustrated in FIG. 4, into a deflected position as illustrated in FIG. 5, thereby reducing the volume of the ink jet 6 such that a droplet of ink is forcibly ejected from the nozzle 4. Upon removal of the first voltage differential, the piezoelectric actuator 9 returns to the rest position. As the ink jet 6 now contains a reduced amount of ink, replenishing ink is drawn from the reservoir 16 through the fill channel 18. As may be seen in FIG. 2B, the first voltage differential across the piezoelectric actuator 9 is produced by a controller 13 applying a first, positive, voltage to the electrode 10 via a lead while the second electrode 11 is connected to ground.

In a second manner not illustrated in the drawings, the piezoelectric actuator 9 is first displaced away from the ink jet 6, for example, by applying a second voltage differential of opposite polarity to the first voltage differential between the first electrode 10 and the second electrode 11, thereby increasing the volume of the ink jet 6 and drawing ink into the ink jet 6 from the reservoir 16. Upon removal of the second voltage differential, the piezoelectric actuator 9 returns to the rest position, thereby effecting a reduction in the volume of the ink jet 6 that forcibly ejects a droplet of ink through the nozzle 4. This second voltage differential is produced by the controller 13 applying a second, negative, voltage to the electrode 10 via a lead 15 while the second electrode 11 remains connected to ground.

In a third manner, also not illustrated in the drawings, the piezoelectric actuator 9 may be displaced away from the ink jet 6, for example, by applying the second voltage differential, to increase the volume of the ink jet 6 and draw ink into the ink jet 6. Then the piezoelectric actuator 9 may be displaced past its initial position and into the ink jet 6, for example, by removing the second voltage differential and applying the first voltage differential, thereby producing a greater compression of the ink jet 6 resulting in the ejection of a larger droplet of ink. Finally, the piezoelectric actuator 9 returns to its rest position whereby replenishing ink would be drawn into the ink jet 6 by removing the first voltage differential.

Referring next to FIG. 3, the configuration of the ink jet 6, as well as the method of manufacturing the ink jet printhead 2 having a page-wide array of piezoelectric actuators 9 will now be described in greater detail. A relatively thick block of polyamide or other non-conductive material, a thin sheet of piezoelectric material, for example, lead zirconate titanate (or "PZT"), and a block of a ceramic or other nonconductive material, each having a generally rectangular cross-section having approximately the same length and height, are provided. From these materials, the orifice plate 14, an active layer 20 having a series of piezoelectric actuators 9 formed thereon, and a rigid substrate 22 are respectively constructed. The rigid substrate 22 is preferably a ceramic, but may also be some other nonconductive material that is sufficiently sturdy to provide support for the ink jet printhead 2.

The orifice plate 14 is formed from the relatively thick block of polyamide by a micromachining process, such as one that uses an excimer laser, to ablate selected portions of the orifice plate 14. More specifically, a single ink reservoir 16 is formed by ablating, to a first depth, a selected area, preferably of a generally rectangular shape, of a back side surface 14*b* of an upper part of the polyamide material. A series of generally cylindrical ink jets 6 are formed by ablating, to a second depth, greater than the first depth, selected areas of the back side surface 14*b* of a lower part of the polyamide material. Preferably, the jets 6 are positioned equidistant from each other along a line, generally parallel to a top side surface 14*c*, and extending along the entire width of the polyamide material at a jet density of about 300 jets per inch. A series of ink ejection nozzles 4, one corresponding to each jet 6 and preferably having a generally cylindrical shape and located in the general center of the corresponding ink jet 6, are then formed. Each nozzle 4 extends from the second interior side surface 14*d* exposed during the formation of the corresponding jet 6 to the front side surface 14*a*. In alternate embodiments of the invention, the nozzles 4 may be formed by drilling apertures, again, by an ablation process, by directing an excimer location onto select locations of either the front side surface 14*a* or the second interior side surface 14*d*. Finally, a series of fill channels 18, each of which extend from one of the jets 6 to the ink reservoir 16 are formed. Preferably, the fill channels 18 should be narrow, relative to the dimensions of the ink jet 6 to limit the propagation of pressure waves generated in the ink jet 6 into the ink reservoir 16. It should be noted, however, that the shape and relative dimensions of the ink reservoir 16, the fill channels 18 and the ink jets 6 are purely exemplary and that numerous shapes and sizes may be employed therefor without departing from the scope of the invention.

A series of piezoelectric actuators 9, one for each ink jet 6 are then formed on the active layer 20 by depositing, for each of the ink jets 6 formed in the orifice plate 14, the first and second electrodes 10 and 11 on the front and back side surfaces 20*a*, 20*b*, respectively, of the active layer 20. The first and second electrodes 10 and 11 for each of the ink jets 6 are positioned such that, when the active layer 20 and orifice plate 14 are aligned and mated with each other, the first and second electrodes 10 and 11 should be aligned with the corresponding ink jet 6. Preferably, the first and second electrodes 10 and 11 are generally circular in shape and sized to have a diameter roughly equal to the diameter of the corresponding ink jet 6.

Also formed on the front side surface 20*a* of the active layer 20 are a series of leads 15 that provide electrical connection between the electrodes 10 and a controller 13 configured to apply selectively a voltage of a selected magnitude and polarity to the electrodes 10. In the embodiment of the invention illustrated herein, the controller 13 is mounted on the front side surface 20*a* of the active layer 20 and below the electrodes 10, preferably within an aperture 17 formed by ablating a second selected area of the back side surface 14*b* of a lower part of the polyamide material. It should be noted, however, that the controller 13 may be mounted at other locations on the front side surface 20*a*, for example, above the electrodes 10 and in the general vicinity of the manifold 16, or even elsewhere on the active layer 22 or the ink jet printhead 2 without departing from the scope of the invention. Preferably, the electrodes 10 and leads 15 are formed on the front side surface 20*a* of the active layer 20 using a metal deposition or other patterning process known in the art.

Similarly, a series of leads (not shown) should be formed on the back side surface 20*b* of the active layer 20 to provide electrical connections for the electrodes 11 to ground.

A preferable method for forming on the active layer 20 the first and second electrodes 10 and 11 and the leads 15 will now be described. A first and second relatively thin sheet of conductive metal (not shown) are provided, having generally similar lengths and heights as the sheet of provided piezoelectric material. The first sheet of conductive metal is aligned and mated with the front side surface 20*a* of the active layer 20 and the second sheet of conductive metal is aligned and mated with the back side surface 20*b* of the active layer 20. The first and second electrodes 10 and 11 and the leads 15 are then formed on the active layer 20 by etching away the portions of the first and second sheets of conductive metal that do not comprise the desired dimensions of the first and second electrodes 10 and 11 and the leads 15. It should be noted that the envisioned etching techniques and methods employed in this preferred method are comparable to those generally known in industry to manufacture computer circuit boards and other forms of hard wiring. Additionally, the foregoing method may be modified as needed to produce the various embodiments described in this specification and other embodiments within the scope of the invention.

In an alternative embodiment of the invention, it may be desirable to connect the electrodes 11 to the controller 13; however, as the controller 13 is mounted on the front side surface 20*b* of the active layer 20, the leads 15 formed on the back side surface 20*b* should either extend through an aperture in or around the edge of the active layer 20. Alternatively, the controller 13 may have a series of control leads (not shown) which extend through the active layer 20 and to the back side surface 20*b* where they may be coupled to the leads 15.

During a print operation, a series of control signals that identify which ink jets 6 are to be activated are transmitted to the controller 13 via the ribbon cable 12. The controller 13 is comprised of conventional logical circuitry, which decodes the received control signals and applies a voltage of appropriate magnitude and polarity to selected electrodes 10. By providing appropriate logical circuitry within the controller 13, the number of electrical connections between the page-wide ink jet printhead 2 and the remainder of the printer necessary to activate the desired ink jets 6 may be substantially reduced. For example, to be able to issue a firing command for each of the 3,300 ink jets 6 forming the page-wide ink jet printhead 2, the ribbon cable 12 should include 12 conductors. Of course, if additional print controls are desired, for example, spot size modulation, which will require variations in the magnitude and/or duration of the voltages applied to the electrodes 10, additional conductors that connect the controller 13 and the remainder of the printer will be required.

If it is desired to reduce the amount of piezoelectric material used in the active layer 20, it is contemplated that, in one embodiment of the invention, a single strip of piezoelectric material having first and second strips of inactive material bonded to top and bottom edge surfaces thereof may be used in place of the active layer 20. In this embodiment, the strip of piezoelectric material should be sized such that, when the composite layer is aligned and mated with the orifice plate 14, the strip of piezoelectric material is positioned adjacent to the ink jets 6.

After mounting the electrodes 10 and 11 to the active layer 20, a layer 23 of a non-conductive adhesive is applied to the portion of the back side surface 20*b* of the active layer 20 above and below the line of spaced electrodes 11. The back side surface 20*b* of the active layer 20 is then aligned and mated with a front side surface 22*a* of the rigid substrate 22. It should be noted that, as the deflection of the active layer 20, as described above, could potentially result in movement of the rigid substrate 22, a series of breather holes 25, each of which extends through the rigid substrate 22 and to one of the electrodes 11, should be formed in the rigid substrate 22 to prevent potential deformation thereof. A layer 21 of an adhesive material is then applied to the portion of the back side surface 14*b* of the orifice plate 14 that was not removed during the ablation process and the orifice plate 14 is aligned and mated with the active layer 20 to complete construction of the ink jet printhead 2 having a page-wide array of piezoelectric actuators 9.

Referring next to FIGS. 6 and 7, an alternative configuration of the piezoelectric actuator 9, herein referred to as piezoelectric actuator 9', is formed by varying the portion of the active layer 20 selected for electroding. More specifically, rather than forming electrodes on both the front and back side surfaces 20*a* and 20*b*, a pair of electrodes 11', 11" may be formed on one side of the active layer 20. In the embodiment illustrated herein, the electrode pair 11', 11" are formed on the back side surface 20*b* of the active layer 20. It should be clearly understood, however, that the electrode pair 11', 11" may be formed on the front side surface 20*a* instead.

Similar to the electrode 11, the first electrode 11' of the electrode pair is formed as a circle. The second electrode 11", however, is formed as a concentric outer ring that surrounds the electrode 11'. The first and second electrodes 11' and 11" are respectively coupled to the controller, not shown, by leads 27' and 27". As before, ink is forcibly ejected from the ink jet 6 by applying a voltage differential between the electrodes 11', 11" that causes that portion of the active layer 20 forming the piezoelectric actuator 9', i.e., the electroded portion of the active layer 20, to deflect.

The primary advantage of this configuration of the invention over that previously described with respect to FIGS. 1–5 is that electrodes need only be deposited on a single side of the active layer 20. Furthermore, as both electrodes are positioned on the same side, the task of connecting both to the controller, as opposed to connecting one electrode to the controller and the other to ground, is greatly simplified. By connecting both electrodes to the controller, it is possible to produce a voltage differential by simultaneously applying a positive voltage to one electrode and a negative voltage to the other.

Referring next to FIG. 8, yet another alternative configuration of the piezoelectric actuators 9, is formed by varying the portion of the active layer selected for electroding. As before, both electrodes 10', 10" of the electrode pair are formed on one side of the active layer 20, for example, the front side surface 20*a*. Here, however, each first electrode 10' is formed as a elongated strip aligned with an ink jet 6 and each second electrode 10" is formed as a pair of elongated strips located on opposite sides of the first electrode 10' and beyond the periphery of the ink jet 6. Each first electrode 10' is connected to the controller 13 while the second electrodes 10" are commonly connected to ground. Preferably, the ink jets 6 should now be oval shaped to better enable the placement of the second electrodes 10" between adjacent ink jets 6.

Referring next to FIG. 9, a multi-color ink jet printhead 2' for printing with different color or types of inks that incorporates plural page-wide arrays of piezoelectric actuators arranged in one of the configurations set forth above, may now be seen. The multi-color ink jet printhead 2' is similar in design to the single color ink jet printhead 2 discussed at length herein. Rather than having a single ink reservoir 16 located above a page-wide array of ink jets 6, which terminates in a row of ink ejection nozzle 4 formed in the orifice plate 14, the multi-color ink jet printhead 2' is provided with first, second, third and fourth ink reservoirs 16*a*, 16*b*, 16*c* and 16*d*, illustrated in phantom in FIG. 9, for holding cyan, magenta, yellow and black inks, respectively. First, second, third and fourth fill channels 18*a*, 18*b*, 18*c*, and 18*d* respectively couple the first, second, third and fourth ink reservoirs 16*a*, 16*b*, 16*c* and 16*d* with a series of ink jets, located below the corresponding ink reservoir, which terminate in a row of ink ejecting nozzles 4*a*, 4*b*, 4*c* and 4*d*, respectively, formed in orifice plate 14'. Coupled to each ink jet is a piezoelectric actuator, connected to controller 13' by electrodes not shown.

It should be noted that considerable detail has been omitted from the description of the multicolor ink jet printhead 2' for the reason that, apart from providing four ink reservoirs, each having a corresponding page-wide array of piezoelectric actuators and ink jets, such details are similar to those described with respect to the single color ink jet printhead 2. Having to control the actuation of four times as many ink jets, the internal electronics of the controller 13' are considerably more complex. These similarities between the two embodiments illustrate the relatively minor modifications in design necessary to produce a multi-color, rather than a single color, ink jet printhead.

Thus, there has been described and illustrated herein, various embodiments, both single and multicolor, of an ink jet printhead having a page-wide array of piezoelectric actuators. In addition to overcoming the deficiencies inherent in shuttle-type ink jet printheads, each of the embodiments described herein are very versatile and allow for a broad range of printing applications, including variable color and ink drop size.

The foregoing detailed description is to be clearly understood as being given by way of illustration and example only, the spirit and scope of the present invention being limited solely by the appended claims.

What is claimed is:

1. A method of constructing an orifice plate for a page-wide ink jet printhead, comprising the steps of:

providing a block of material for the formation of a page-wide ink jet printhead, said block of material having front and back side surfaces;

forming an ink reservoir by removing a first portion of said block of material, thereby exposing a first interior side surface of said block of material;

forming a series of ink jets by removing a second portion of said block of material at a series of spaced locations, thereby exposing a second interior side surface of said block of material, said spaced locations of said series of ink jets extending generally across said back side surface; and forming an ink ejection nozzle for each one of said series of ink jets by removing a third portion of said block of material at said series of spaced locations, each said ink ejection nozzle extending between said second interior side surface and said front side surface of said block of material.

2. The method of constructing an orifice plate for a page-wide ink jet printhead according to claim 1 and further comprising the step of forming a corresponding series of fill channels, each one of said series of fill channels extending between one of said ink jets and said ink reservoir.

3. The method of constructing an orifice plate for a page-wide ink jet printhead according to claim 1 wherein the steps of forming said ink reservoir, said series of ink jets and said corresponding series of ink ejection nozzles further comprise the steps of removing said first, second and third portions of said block of material using an excimer laser to form said ink reservoir, said series of ink jets and said corresponding series of ink ejection nozzles, respectively.

4. The method of constructing an orifice plate for a page-wide ink jet printhead according to claim 1 wherein said block of material is polyamide.

5. The method of constructing an orifice plate for a page-wide ink jet printhead according to claim 1 wherein said ink reservoir is formed in a generally rectangular shape.

6. The method of constructing an orifice plate for a page-wide ink jet printhead according to claim 1 wherein said ink jets are formed in a generally cylindrical shape.

7. The method of constructing an orifice plate for a page-wide ink jet printhead according to claim 1 wherein said ink jets are positioned equidistant from each other along a line generally parallel to said front side surface.

8. The method of constructing an orifice plate for a page-wide ink jet printhead according to claim 1 wherein said ink jets extend along the entire width of said block.

9. The method of constructing an orifice plate for a page-wide ink jet printhead according to claim 1 wherein said ink jets are spaced at approximately 300 ink jets per inch.

10. The method of constructing an orifice plate for a page-wide ink jet printhead according to claim 1 wherein each of said ink ejection nozzles are narrower than each of said ink jets.

11. The method of constructing an orifice plate for a page-wide ink jet printhead according to claim 1 wherein each of said ink ejection nozzles is formed in a generally cylindrical shape.

12. The method of constructing an orifice plate for a page-wide ink jet printhead according to claim 2 wherein each of said fill channels is narrow relative to each of said ink jets.

* * * * *